(12) United States Patent
Kjær et al.

(10) Patent No.: US 6,422,333 B1
(45) Date of Patent: Jul. 23, 2002

(54) VEHICLE DRIVING ARRANGEMENT

(75) Inventors: Lars Kjær, Nordborg; Per Lindholdt, Sønderborg; Asger Flintholm, Augustenborg, all of (DK)

(73) Assignee: Sauer - Danfoss Holdings A/S, Nordborg (DK)

( * ) Notice: Subject to any disclaimer, the term of this patent is extended or adjusted under 35 U.S.C. 154(b) by 0 days.

(21) Appl. No.: 09/611,116

(22) Filed: Jul. 6, 2000

(30) Foreign Application Priority Data

Jul. 6, 1999 (DE) ......................................... 199 31 141

(51) Int. Cl.[7] ............................................... B60K 28/16
(52) U.S. Cl. ........................ 180/197; 180/648; 180/246; 701/89; 701/90
(58) Field of Search ........................ 180/197, 6.2, 6.44, 180/6.48, 6.5, 233, 246, 247, 242; 701/65, 69, 74, 89, 90

(56) References Cited

U.S. PATENT DOCUMENTS

| | | | | |
|---|---|---|---|---|
| 5,009,279 A | * | 4/1991 | Matsuda | ..................... 180/197 |
| 5,018,595 A | * | 5/1991 | Hara et al. | ................... 180/197 |
| 5,163,530 A | * | 11/1992 | Nakamura et al. | .......... 180/197 |
| 5,628,378 A | * | 5/1997 | Saito et al. | .................. 180/197 |
| 5,765,929 A | * | 6/1998 | Hirano et al. | ................ 303/112 |
| 5,929,534 A | * | 7/1999 | Pickett | ....................... 307/10.1 |
| 6,135,231 A | * | 10/2000 | Reed | ........................... 180/308 |

* cited by examiner

*Primary Examiner*—Avraham Lerner
(74) *Attorney, Agent, or Firm*—Lee, Mann, Smith, McWilliams, Sweeney & Ohlson

(57) ABSTRACT

A vehicle driving arrangement is provided which has at least two driven wheels, the driving torques of which can be individually regulated by a control device, the control device being connected to a sensor arrangement comprising at least one sensor. Using such a driving arrangement, wheel slip is to be prevented. For that purpose, using a signal of the sensor arrangement, the control device continuously ascertains a maximum torque for each wheel, continuously ascertains the driving torque of each wheel and reduces the driving torque by the appropriate amount when the driving torque ascertained no longer complies with a predetermined limit of difference from the maximum torque.

14 Claims, 3 Drawing Sheets

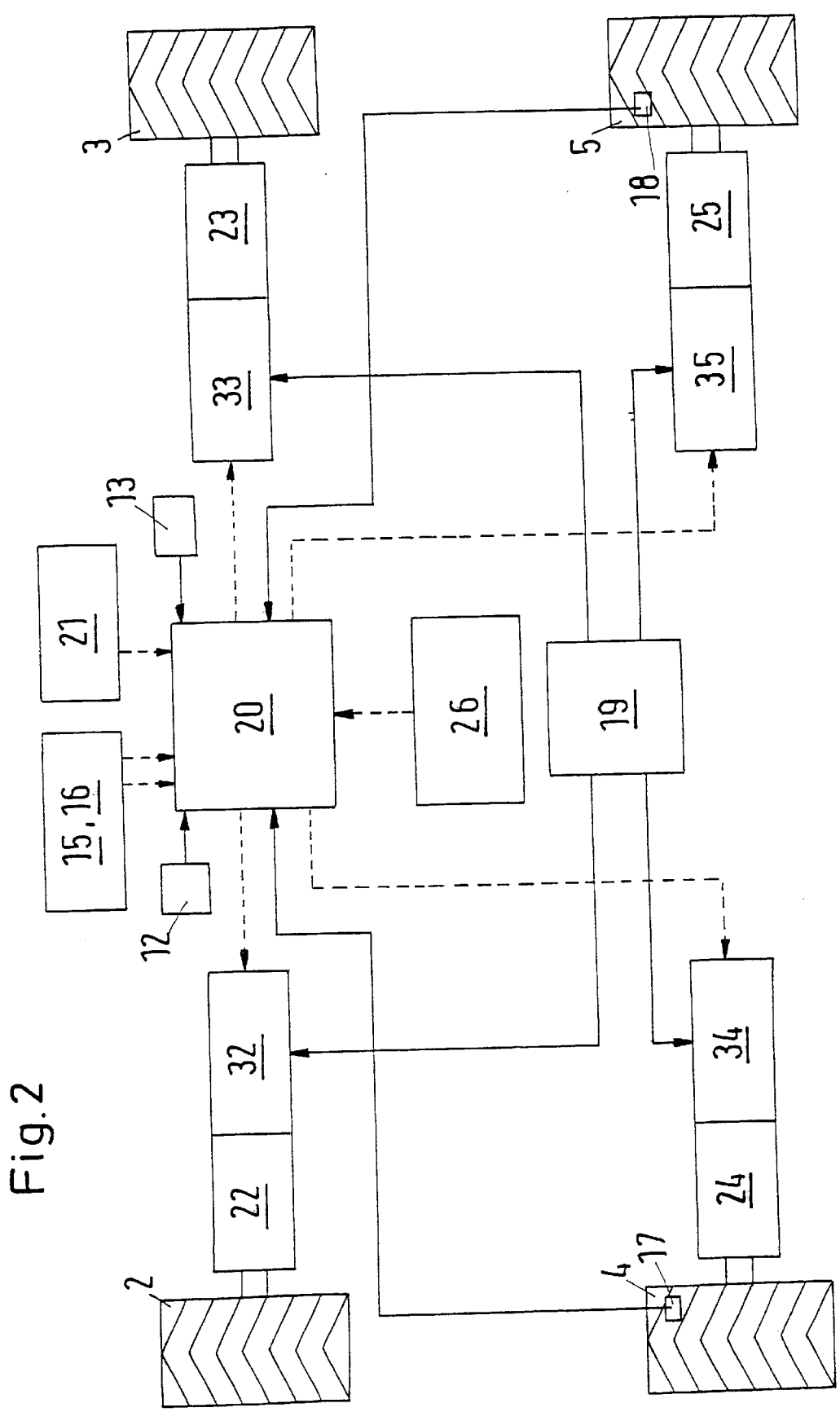

VEHICLE DRIVING ARRANGEMENT

Figure 1A:
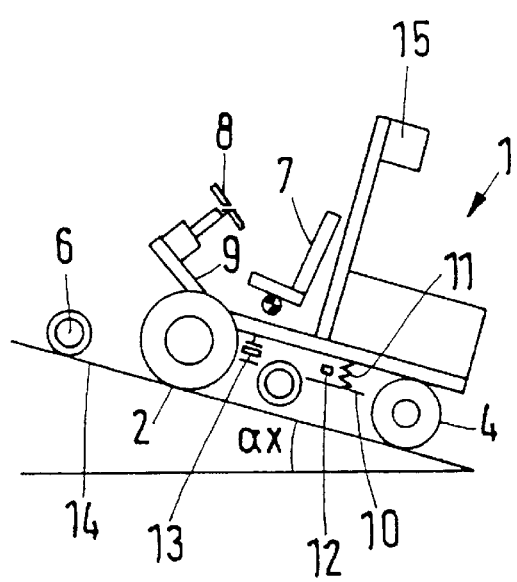

The invention relates to a vehicle driving arrangement having at least two driven wheels the driving torques of which can be individually regulated by a control device, the control device being connected to a sensor arrangement comprising at least one sensor.

A vehicle driving arrangement of that kind is known from DE 196 38 421 A1. The vehicle described therein is driven hydraulically. The control device is connected to several sensors. One group of sensors ascertains the respective speeds of the wheels. A further sensor establishes whether the vehicle is moving over an inclined surface having an angle of inclination greater than 7°. By comparing the rolling speeds of the wheels, which are found from the dimensions of the wheels and the speeds of rotation, wheel slip is calculated. If the wheel slip becomes too great, that is to say, if the speed of one wheel greatly differs from the speed of another wheel, the displacement of the hydraulic motor of the wheel having the highest wheel speed is reduced. The sensor that detects movement over an inclined surface is used to prevent power reduction of a drive motor in certain circumstances, namely when the vehicle is travelling uphill or downhill.

A similar arrangement is known from U.S. Pat. No. 5,201,570. Therein, four wheels are driven by hydraulic motors. The wheel speed of each wheel is monitored. If the speeds differ greatly, then the "fastest" wheel is braked.

Such methods of preventing slip are referred to as reactive processes. Slip has to have occurred in the first place, therefore. When such slip has been detected, the driving power of the wheel is reduced so that the wheel changes over from sliding friction to rolling friction again.

Various kinds of reactive processes are known from the automobile industry and are used in anti-slip systems. In some cases, the wheel that is assumed to be spinning is also braked.

Such driving arrangements have proved successful in many cases. They suffer from the disadvantage, however, that wheel slip has to occur in the first place before it can be remedied. Those driving arrangements are not suitable, therefore, for vehicles that must not damage the ground on which they are travelling. A typical example of such a situation arises in the case of self-propelled lawn mowers as are used, for example, for golf courses. A spinning wheel will damage the grass turf. The purpose of the lawn mower, to care for the lawn, will thus be reversed.

The problem underlying the invention is to keep the risk of wheel slip small.

That problem is solved in the case of a driving arrangement of the kind mentioned at the beginning by means of the fact that, using a signal of the sensor arrangement, the control device continuously ascertains a maximum torque for each wheel, continuously ascertains the driving torque of each wheel and reduces the driving torque by the appropriate amount when the driving torque ascertained no longer complies with a predetermined limit of difference from the maximum torque.

Driving torque is to be understood herein to mean both a moment that serves to propel the vehicle and a moment that serves to brake the vehicle. The latter case occurs, for example, when the vehicle is rolling downhill and is to be braked by the engine.

The control device continuously ascertains for each wheel, therefore, a maximum torque, using signals from the sensor arrangement. The maximum torque is the moment at which the wheel spins (when driven) or locks (when braked). A slip condition of that kind occurs when the force parallel to the ground at the bearing point between the wheel and the ground (hereinafter "driving force") is greater than the adhesive force which can be calculated, for example, from the product of the coefficient of friction and the normal force. The normal force is known in principle. It is determined mainly by the weight of the vehicle (with driver and fittings). It changes during operation, however, owing to various circumstances. Those circumstances can be detected by the sensor arrangement, with the result that the maximum permissible torque can be ascertained with greater reliability. If care is taken that the driving torque acting on the individual wheel is kept smaller than the maximum permissible moment, then slipping does not occur at all in the first place. Damage to the ground is therefore reliably avoided.

In a preferred embodiment, provision is made for the sensor arrangement to have an inclination sensor. A decisive factor in the determination of the normal force from the weight is the inclination of the vehicle relative to the direction of gravity. The more inclined is the. vehicle, the smaller becomes the normal force towards the ground and the greater becomes the risk of slip. In addition, when the vehicle is inclined, a different weight distribution over the individual wheels, and hence a change in the normal force distribution over the wheels, is also produced. That change also can be taken into consideration, so that, for example, the wheels that are lower down receive a greater driving power than do the wheels that are higher up.

It is preferred in that connection for the inclination sensor to ascertain the inclination parallel to the longitudinal direction of the vehicle and the inclination transverse to the longitudinal direction of the vehicle. In most cases, the vehicle will be inclined both longitudinally and transversely. By ascertaining the two angles of inclination separately, however, the control can be simplified and improved.

The sensor arrangement preferably has a normal force sensor. The normal force is determined in principle, as mentioned above, according to the weight of the vehicle which is distributed over the individual wheels in accordance with a specific ratio system. That weight can change, however. For example, various drivers with differing body weights can be used. The vehicle consumes fuel, as a result of which its weight decreases during operation. If the vehicle is spreading any products, for example is applying fertilisers or sowing grass seed, the weight of the vehicle similarly changes. By means of the normal force sensor it is possible to ascertain that change during operation or between individual phases of operation.

In one advantageous embodiment, the normal force sensor is in the form of a load cell. In that case, it actually weighs the vehicle. The weighing can be limited to when the vehicle is standing on a horizontal plane surface if the inclination is later taken into consideration.

In another or additional embodiment, the normal force sensor can be in the form of a pressure transducer which ascertains the tyre pressure of the driven wheel. The tyre pressure is also a measure of the loading of the tyre and hence of the force acting in the vertical direction. When the vehicle is standing on a horizontal plane surface, the tyre pressure is directly a measure of the normal force. In the case of inclined ground, the normal force has to be converted accordingly.

Finally, the normal force sensor can also monitor the spring behaviour of a vehicle spring system. The more the vehicle is loaded, the more it deflects the spring system. Evaluation of the spring characteristic allows information to be gained, at least indirectly, on the vehicle weight, and hence also on the normal force on the driven wheel.

Preferably, the control device is connected to a memory in which vehicle data are filed. Those data can include, in addition to the standard vehicle weight, also details of the rolling resistance of the vehicle, the tractive force required for any trailer and/or towed work implement, such as, for example, mowing apparatus or the like. The memory can also contain information on how specific interventions in the driving power affect the individual motors.

In that connection it is preferred that, for predetermined vehicle data-sensor signal combinations, the corresponding maximum torques of the respective wheels are filed in the memory in the form of a table. For example, the normal force of each individual wheel as a function of the angle of inclination can be filed in the table. The table allows more rapid access to the results than does a calculation.

In addition, the control device can be connected to an input device by means of which ambient and/or operating parameters can be specified. The condition of the ground, for example, can be termed an ambient parameter. In the case of a lawn, a rough distinction according to normal, wet and dry could be made. As an operating parameter, it is possible to specify whether a trailer has to be towed or other work implements are attached.

Preferably, when the control device reduces the driving power of one wheel, it increases the driving power of at least one other wheel. In that case, the overall driving power of the vehicle remains constant, so that the driver does not even notice a change in the drive distribution in most cases.

It is especially preferred in that connection if the control device produces a warning in an operating situation in which a reduction of the driving powers of all the driven wheels is necessary. The driver can then decide what steps to take. For example, he can specify a different coefficient of friction so that the maximum permissible torque is calculated differently. Since in that case, however, there is an increased risk of wheel slip, the driver must proceed very cautiously. Increasing of that coefficient of friction can also be carried out by the system automatically. In that case, the driver must similarly be given a warning.

Preferably, the control device is connected to a steering angle sensor. The control device is therefore able to ascertain the angular position of steered wheels. As soon as a wheel has been turned, that is to say, is no longer rolling in the principal direction of movement of the vehicle, it has a higher travelling resistance, on the one hand, and has a greater tendency to slip, on the other hand. Using the steering angle sensor, that effect can be taken into consideration.

It is also advantageous if the vehicle is equipped with auxiliary-power-assisted steering which is connected to the control device, the control device taking the steering behaviour of the steered wheel into consideration when determining the maximum torque. In addition to or instead of the steering angle sensor, the dynamic behaviour of the wheel during a steering movement can also be taken into consideration in that manner. During the steering movement, the maximum torque is usually reduced.

The invention is described in detail below in connection with the drawings with reference to a preferred illustrative embodiment.

Figure 3:
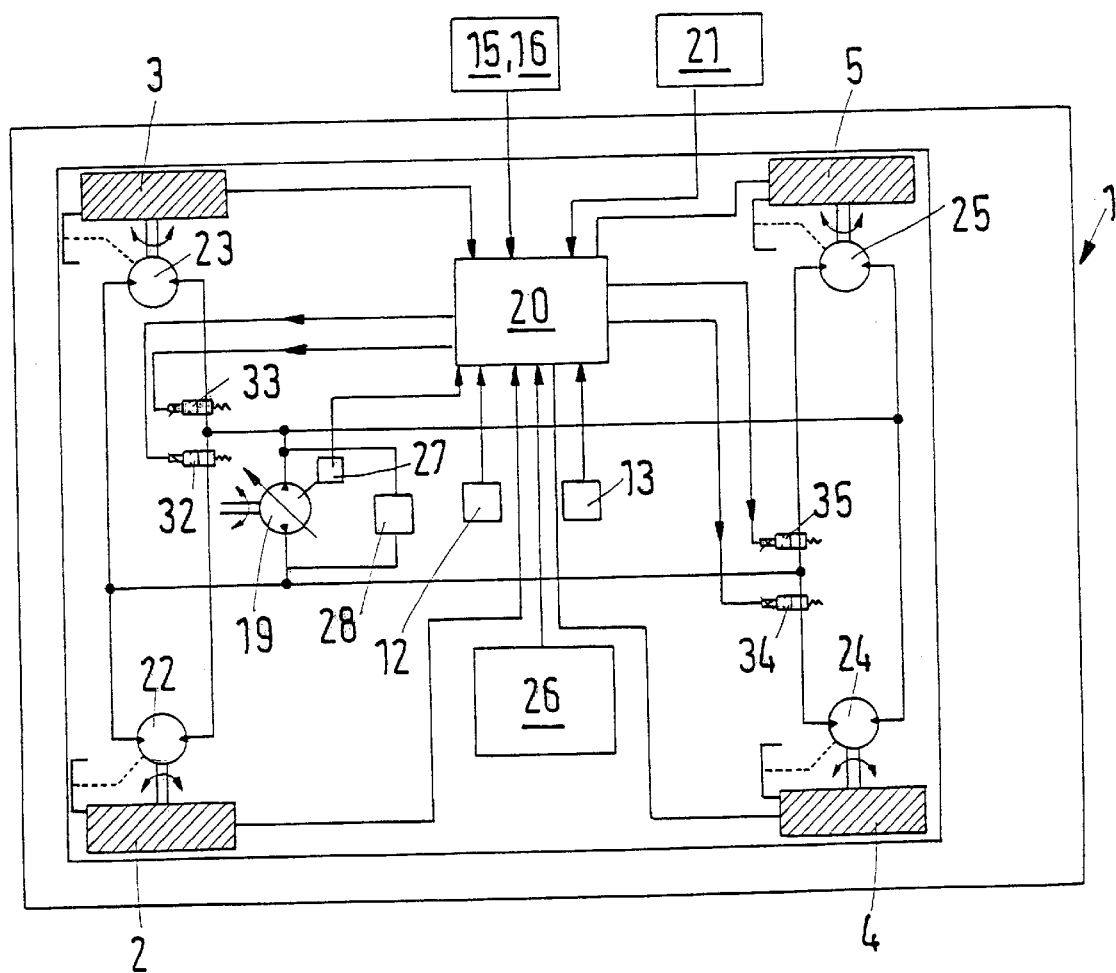

In the drawings:

FIG. 1 is a schematic view of a typical vehicle equipped with the vehicle driving arrangement, FIG. 2 is a schematic block diagram of the vehicle drive, and FIG. 3 shows a practical implementation of the vehicle drive with a hydraulic system.

FIG. 1 shows a vehicle 1 in the form of a self-propelled lawn mower as is used, for example, on golf courses or in parks. The vehicle 1 has front wheels 2, 3 and rear wheels 4, 5, all of which are driven. The vehicle has work implements mounted on it, for example mowing apparatus 6 with which the grass is to be cut. A driver's seat 7, in front of which a steering wheel 8 is situated, is provided for a driver, not shown. Provided beneath the steering wheel are control elements, not shown in detail, such as an accelerator or brake pedal 9.

The vehicle 1 has a chassis 10, likewise shown merely schematically, to which the wheels 2–5 are attached. The remaining mass of the vehicle is mounted on the chassis 10 by way of a spring arrangement symbolised by a spring 11. The deflection of the spring 11 can be ascertained by means of a sensor 12. A further sensor 13 is in the form of a load cell which is able to detect the weight of the vehicle. Those sensors also are shown merely schematically. The person skilled in the art will readily appreciate where such sensors can be arranged in order to ascertain the weight of the vehicle or a bearing force on the ground closely associated with that weight.

Figure 1B:
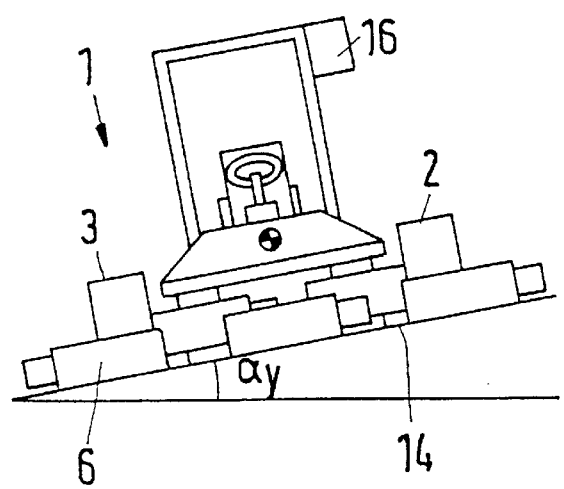

The vehicle 1 is shown in a situation of the kind typically encountered in open terrain. There, the vehicle often has to travel over areas that are inclined to the horizontal. FIG. 1a shows an inclination of the ground 14 lying in the direction of travel of the vehicle 1 and including with the horizontal an angle $\alpha_x$. FIG. 1b shows an inclination transverse to the direction of travel of the vehicle 1. The angle of inclination there is designated $\alpha_y$.

When the vehicle 1 is travelling over an inclined area, two effects occur. Firstly, the normal force, that is to say, the force with which the wheels 2–5 stand on the ground 14, is reduced. That force is directed perpendicular to the ground 14. In the case of horizontal ground, the normal force corresponds to the weight of the parts of the vehicle supported by the corresponding wheel. In the case of an inclined surface, that weight is reduced by the cosine of $\alpha$, that is to say of the corresponding angle of inclination.

Secondly, the weight distribution also changes. The wheels that are lower down (in FIG. 1a the rear wheels 4, 5 and in FIG. 1b the wheels 3) are loaded to a greater extent than are the wheels 2 that are higher up.

In order for a vehicle 1 to be able to travel straight ahead at constant speed, the wheels must deliver in total a force that corresponds to the travelling resistance $F_{FW}$ of the vehicle. The latter consists of the rolling resistance $F_{RW}$, the wind resistance $F_{WW}$, the gradient resistance $F_{NW}$ and the tractive force $F_{ZK}$ which, however, is required only when a trailer or a work implement has to be towed. The gradient resistance can be negative in the case of falling ground, that is to say, it can contribute to the propulsion of the vehicle. The same applies to the wind resistance if the wind is coming from behind.

Accordingly, the travelling resistance is given by $$F_{FW}=F_{RW}+F_{WW}+F_{NW}+F_{ZK}$$

In the case of lawn mowers or similar slow-moving apparatus, the wind resistance can be ignored. Accordingly, it will be left out of the considerations that follow. The travelling resistance is then given by:

$$F_{FW}=F_{RW}+F_{NW}+F_{ZK}$$

The driving force $F_R$ of the individual wheels 2–5 is determined by the moment M of their motors 22–25 (FIG. 2) and the wheel diameter d on the basis of the following equation:

$$F_R = \frac{M}{\frac{1}{2}d}$$

If acceleration of the vehicle is to be obtained, then, in addition to the travelling resistance $F_{FW}$, the wheels must also deliver the force required for the acceleration, that is to say $$F_{FW}+F_{BE}=F_{R,2}+F_{R,3}+F_{R,4}+F_{R,5}$$

where $F_{BE}$ denotes the force required for the acceleration and $F_{Rn}$ indicates the force of the wheel n.

For each wheel there is a limit, set by the motor 22–25, to the driving power which that wheel can deliver. In some cases, however, it is not at all possible to utilize that driving power to the full since the wheel in question spins in the case of only a small driving force. In that case, wheel slip occurs.

The upper limit of the driving force of the individual wheel is determined by the normal force $F_N$ between the ground 14 and the relevant wheel 2–5 and the coefficient of friction $\mu$ between the wheel and the ground. The maximum driving force $F_{MAX}$ for each individual wheel can be determined using the following expression:

$$F_{MAX}=\mu \times F_N$$

Undesirable wheel slip can be avoided, therefore, if the driving force of the individual wheel $F_R$ is kept below the maximum driving force $F_{MAX}$ of the relevant wheel.

The normal force $F_N$ can be ascertained in various ways. For example, it can be calculated from a detailed examination of the vehicle geometry. Another alternative is to ascertain the normal force $F_N$ of each driven wheel of the vehicle when the vehicle is standing on flat ground and is loading it evenly. When the vehicle then comes to inclined ground 14, as is shown in FIGS. 1a and 1b, it is possible to establish the corresponding inclination by means of inclination sensors 15, 16 and convert the normal force. That kind of angle measurement may admittedly give a slightly false result in the case of acceleration. The normal forces on the ground 14 which are ascertained in that manner give, however, an adequate approximation to the normal forces actually prevailing, with the result that undesirable wheel slip can be eliminated with a high degree of certainty.

As mentioned above, the normal force can also be ascertained by other means, for example by the sensors 12 and 13 on the basis of the spring characteristic being known or by the use of load cells. As explained in connection with FIG. 2, the pressure in the tyres of the wheels 4, 5 also can be ascertained by means of tyre pressure sensors 17, 18. The two other wheels 2, 3 also can have tyre pressure sensors, of course.

If the normal force of each wheel 2–5 is multiplied by a given coefficient of friction $\mu$, the maximum driving force $F_{MAX}$ for each individual wheel is obtained, which must not be exceeded if wheel slip is to be avoided.

FIG. 2 is a schematic representation of a vehicle driving arrangement for the vehicle 1. The wheels 2–5 and the motors 22–25 have already been mentioned. Each motor 22–25 is provided with a driving torque limiter 32–35. The driving torque limiters 32–35 are supplied with energy by means of a power source 19, for example with hydraulic fluid under appropriate pressure or with electrical current at a certain voltage. Control of the driving torque limiters is effected by a control device 20. The control device 20 in turn receives information from various sensors, for example from the inclination sensors 15, 16, the spring force sensor 12, the load cell 13, the tyre pressure sensors 17, 18 or other sensors with the aid of which it is possible to ascertain the normal force on the ground 14. Ambient or operating data can be input by means of an input unit 21. For example, a value for the coefficient of friction $\mu$ can be specified here or it can be specified whether the vehicle is provided with a trailer or a work implement.

Finally, a memory 26 is also provided, in which various vehicle data are stored, for example the vehicle weight, the rolling resistance of the wheels, the weight distribution over the individual wheels, etc. In addition, a table in which the normal forces as a function of different angles of inclination $\alpha x$, $\alpha y$ are filed can also be filed in the memory 26.

The control device 20 continuously monitors the torque delivered by each individual motor 22–25. That moment is converted in the control device 6 into a current driving force. At the same time, the control device 20 calculates the maximum driving force for each individual wheel 2–5. The angles $\alpha_x$ and $\alpha_y$, for example, can be used for this. The current driving force of each wheel 2–5 is compared with the maximum driving force of the wheels 2–5. If the driving force of a wheel has reached its maximum driving force, then the driving torque of the corresponding motor is reduced. It is also possible to provide a small safety margin here or—if the coefficient of friction $\mu$ has been estimated with the requisite care—also to permit relatively small excesses within a safety band.

In order to leave the overall driving power of the vehicle 1 constant, in situations where the driving power of one motor is reduced, the control unit 20 can increase the driving power of the other motors.

There may be instances in which three wheels of the vehicle are already travelling with a reduced driving torque and the moment of the fourth motor is likewise to be reduced. In that case, the travelling resistance might be greater than the sum of the driving forces of the wheels. In that case, the wheels 2–5 are no longer able to drive the vehicle. Several possibilities are then available. One possibility is to bring the vehicle 1 to a halt and look for another route. Another possibility is for the driver to increase the coefficient of friction $\mu$. In that case, the system calculates a higher value of the maximum driving force of the wheels. Since that might lead to wheel slip, that procedure must be combined with a warning to the driver. Finally, provision can also be made for the coefficient of friction to be increased automatically. In that case also, a warning to the driver is necessary.

The driving arrangement can be implemented both electrically and hydraulically. FIG. 3 shows one embodiment with hydraulic implementation. Elements corresponding to those in FIG. 2 are provided with the same reference numerals, even when they have been given physical form in the present case.

The four wheels 2–5 of the vehicle 1 are each connected to a hydraulic motor 22–25 via rigid axles. The hydraulic motors 22–25 have a fixed displacement and are able to operate in both directions with the result that the vehicle is able to travel forwards and backwards. The motors 22–25 are connected in parallel and are connected to a variable-displacement pump 19. The pump 19 is driven by an internal combustion engine, not shown, which is able to operate at a fixed speed. The pump 19 is provided with a sensor 27 which supplies the control device 20 with data on the current displacement and the flow direction of the pump 19. The differential pressure across the pump 19 is ascertained by a differential pressure sensor 28.

Located between the pump 19 and each motor 22–25 is a limiter valve 32–35 which is used to regulate the pressure drop across the individual motor 22–25. The pressure drop across the respective motor 22–25 determines the moment delivered by the respective motor 22–25. The limiter valves 32–35 can be constructed, for example, as solenoid valves controlled by the control device 20. The limiter valves 32–35 are used, therefore, to set the pressure drop across the motors, the pressure drop being primarily responsible for the moment produced. The valves 32–35 therefore operate as torque limiters. The other sensors correspond to those in FIG. 2. It is shown, in addition, that each wheel 2–5 is provided with a tyre pressure sensor.

The inclination sensors 15, 16 continuously measure the angles $\alpha_x$, $\alpha_y$. The data on the vehicle which are stored in the memory 26 also contain, in addition to the data described, control characteristics of the valves 32–35, that is to say, the relationship between their control signals, flow rates and the pressure drop, the rotary speed of the pump, the displacement of the motors 22–25 and data on the efficiency thereof.

The operation of the driving arrangement in a vehicle travelling forwards and upwards will be described below. It is easily possible for the person skilled in the art to translate that procedure also to a vehicle travelling forwards and downwards or a vehicle travelling backwards and upwards or downwards.

The driving torque of the motors 22–25 is ascertained continuously. By means of the differential pressure sensor 28, the differential pressure across the pumps 19 is measured. On the basis of the rotary speed of the pump 19 and the flow direction, which is available via the sensor 27, and from the position and characteristic of the valves 32–35 it is possible to determine the pressure drop across each motor. From the pressure drop and the displacement and the efficiency of each motor 22–25 it is possible to determine the current torque which can be converted with the aid of the radius of the relevant wheel 2–5 into the current driving force. The current driving force is compared with the maximum driving force. If the maximum driving force of one of the motors 22–25 threatens to be exceeded, the limiting valve 32–35 of the corresponding motor is throttled in order to reduce the pressure drop across the motor. That pressure reduction causes a greater pressure drop across the other motors. Their driving force is increased in the process, with the result that the overall driving force of the vehicle 1 is kept constant. The increased driving force of the other motors 22–25 must, of course, also be continuously monitored as to whether the maximum force is exceeded.

During that monitoring, it may be found that the driving power for further motors has to be reduced. It may be that, after an appropriate driving force reduction, the sum of all the driving forces is no longer sufficient to move the vehicle forwards. In that case, either the driver can look for another route having, for example, a smaller gradient, or he or the control device 20 can increase the coefficient of friction, which in turn increases the maximum permissible force. Since there is a danger in that case that the wheels may spin or slip, that procedure must be handled with a greater degree of caution. The control device then also emits a corresponding warning.

When the vehicle is travelling down a slope, given an appropriate gradient the situation may arise in which the motors 22–25 operate as pumps driven by the wheels 2–5. In that case, the pressure relationships at the pump 19 are reversed, that is to say, the lower pressure is at the inlet side and the higher pressure is at the return side. The higher pressure at the return side means that the motors 22–25 have to pump against a high pressure. That requires a greater force against which the wheels 2–5 have to turn, with the result that the vehicle is braked. If that braking pressure is still not sufficient, the valves 32–35 can be throttled to a greater extent in order to increase the counter-pressure. In addition, by appropriate regulation of the valves 32, 33 and 34, 35 associated with the wheels lying the furthest uphill, those motors can be prevented from turning counter to the direction of travel. The latter must be prevented since otherwise slip will occur and control of the vehicle will be lost. Such a situation could occur in the following instance: the vehicle is travelling forwards downhill. If, in that case, the differential pressure across the motors 22, 23 generates a force that is greater than the maximum driving force of the rear wheels 4, 5, since the friction of the rear wheels against the ground is no longer able to cause rotation in that situation, then by means of the valves 34, 35 the pressure drop across the rear motors 24, 25 can be reduced, so that those wheels no longer turn counter to the direction of movement.

The driving arrangement can, of course, also be operated by electric motors driven, for example, by a frequency converter. Using the data from the frequency converter it is possible to determine the current moment of the individual wheel and to regulate it if the moment is too great based on the maximum force. Determination of the maximum force can be carried out, however, in the same way as that described above.

In a manner not shown, the control device can also be connected to a steering angle sensor which ascertains the steering angle or steering lock of steered wheels of the vehicle. When steered wheels are turned out of the straight position, the travelling resistance of the vehicle increases for the other, unturned wheels. For the turned wheels it is possible that a slightly differing normal force distribution will be produced. For example, the wheel on the outside of the curve can receive a slightly greater normal force than does the wheel on the inside of the curve. By means of the steering angle sensor the control device is able to recognise that situation and take it into consideration when calculating the magnitude of the maximum torque or the maximum driving force.

In addition to or instead of the steering angle sensor, the control device can be connected to auxiliary-power-assisted steering. In that case, it can also find information on the steering behaviour of the steered wheel. During the time when the wheel is not only rolling over the ground but is simultaneously changing its direction, that is to say is turning about a vertical axis, the friction behaviour between wheel and ground is changed slightly, and therefore that change ought to be taken into consideration when calculating the maximum driving force. During a steering movement, the maximum driving force is therefore reduced slightly.

What is claimed is:

1. A vehicle driving arrangement having at least two driven wheels, driving torques of which can be individually regulated by a control device, the control device being connected to a sensor arrangement comprising at least one sensor, and in which, using a signal of the sensor arrangement, the control device includes means to continuously ascertain a maximum torque for each wheel where slippage occurs, to continuously ascertain the driving torque of each wheel and to reduce the driving torque for each wheel by an appropriate amount when the driving torque ascertained no longer complies with a predetermined limit of difference from the maximum torque so that slippage does not occur.

2. An arrangement according to claim 1, in which the sensor arrangement includes an inclination sensor.

3. An arrangement according to claim 2, in which the inclination sensor ascertains inclination parallel to the longitudinal direction of the vehicle and inclination transverse to the longitudinal direction of the vehicle.

4. An arrangement according to claim 1, in which the sensor arrangement includes a normal force sensor.

5. An arrangement according to claim 4, in which the normal force sensor comprises a load cell.

6. An arrangement according to claim 4, in which the normal force sensor comprises a pressure transducer which ascertains tire pressure of the driven wheels.

7. An arrangement according to claim 4, in which the normal force sensor also monitors spring behavior of a vehicle spring system.

8. An arrangement according to claim 1, in which the control device is connected to a memory in which vehicle data is located.

9. An arrangement according to claim 8, in which, for predetermined vehicle data-sensor signal combinations, the corresponding maximum torques of the respective wheels are located in the memory in the form of a table.

10. An arrangement according to claim 1, in which the control device is connected to an input device by means of which at least one of ambient and operating parameters can be specified.

11. An arrangement according to claim 1, in which, when the control device reduces the driving torque of one wheel, it increases the driving torque of at least one other wheel.

12. An arrangement according to claim 11, in which the control device produces a warning in an operating situation in which a reduction of the driving torques of all the driven wheels is necessary.

13. An arrangement according to claim 1, in which the control device is connected to a steering angle sensor.

14. An arrangement according to claim 1, in which the vehicle includes auxiliary-power-assisted steering which is connected to the control device, the control device taking the steering behavior of the wheels being steered into consideration when determining the maximum torque.

* * * * *